(12) United States Patent
Hecht et al.

(10) Patent No.: US 7,553,112 B1
(45) Date of Patent: Jun. 30, 2009

(54) CUTTING INSERT

(75) Inventors: Gil Hecht, Nahariya (IL); Ilan Vaserman, Nahariya (IL); Benjamyn Cohen, Nahariya (IL)

(73) Assignee: Iscar, Ltd., Tefen (IL)

( * ) Notice: Subject to any disclaimer, the term of this patent is extended or adjusted under 35 U.S.C. 154(b) by 112 days.

(21) Appl. No.: 11/422,800

(22) Filed: Jun. 7, 2006

(30) Foreign Application Priority Data

Jun. 22, 2005 (IL) .................................... 169340

(51) Int. Cl.
*B23B 27/16* (2006.01)

(52) U.S. Cl. .......................... 407/113; 407/103; 407/66

(58) Field of Classification Search .................. 407/42, 407/48, 53, 61, 62, 113, 110, 66, 102, 101, 407/120, 103
See application file for complete search history.

(56) References Cited

U.S. PATENT DOCUMENTS

| 4,464,087 | A |   | 8/1984  | Muller |         |
|-----------|---|---|---------|--------|---------|
| 4,681,488 | A |   | 7/1987  | Markusson |     |
| 5,158,401 | A |   | 10/1992 | Pawlik |        |
| 5,190,418 | A | * | 3/1993  | Nakayama et al. | 407/42 |
| 5,454,671 | A |   | 10/1995 | Qvarth |        |
| 5,466,097 | A | * | 11/1995 | Wallstrom | 407/113 |
| 5,807,031 | A | * | 9/1998  | Arai et al. | 407/113 |
| 5,951,214 | A | * | 9/1999  | Rothballer et al. | 407/42 |
| 6,039,515 | A | * | 3/2000  | Lamberg | 408/188 |
| 6,238,146 | B1 |  | 5/2001  | Satran et al. | |
| 6,543,970 | B1 | * | 4/2003 | Qvarth et al. | 407/114 |
| 6,632,051 | B1 |  | 10/2003 | Wermeister | |
| 6,872,034 | B2 | * | 3/2005 | Satran et al. | 407/113 |
| 7,008,148 | B2 | * | 3/2006 | Wiman et al. | 407/113 |
| 7,073,987 | B2 | * | 7/2006 | Hecht | 407/113 |
| 7,168,512 | B2 | * | 1/2007 | Schuffenhauer et al. | 175/426 |
| 7,390,148 | B2 | * | 6/2008 | Krenzer et al. | 407/30 |
| 2002/0090272 | A1 | * | 7/2002 | Waggle | 407/114 |
| 2003/0086767 | A1 |  | 5/2003 | Wiman et al. | |
| 2003/0170079 | A1 | * | 9/2003 | Daiguji et al. | 407/34 |
| 2004/0101371 | A1 | * | 5/2004 | Arvidsson et al. | 407/48 |
| 2005/0249559 | A1 |  | 11/2005 | Lof et al. | |
| 2007/0059110 | A1 | * | 3/2007 | Choi et al. | 407/113 |

FOREIGN PATENT DOCUMENTS

DE 20014428 8/2000
JP 59214501 5/1983

OTHER PUBLICATIONS

International Preliminary Report on Patentability in PCT/IL2006/000661; mailed Sep. 20, 2007.

* cited by examiner

*Primary Examiner*—Boyer D Ashley
*Assistant Examiner*—Sara Addisu
(74) *Attorney, Agent, or Firm*—Womble Carlyle Sandridge & Rice, PLLC

(57) ABSTRACT

A cutting insert has two opposing end surfaces, a peripheral side surface extending therebetween and a peripheral edge formed at an intersection of each end surface with the peripheral side surface. The peripheral edge includes two minor edges and a cutting edge extending therebetween, a first section of each minor edge extending from the cutting edge generally towards the opposing end surface.

21 Claims, 4 Drawing Sheets

CUTTING INSERT

FIELD OF THE INVENTION

The present invention relates to a generally square cutting insert for use in metal cutting processes in general and for radial and axial turning in particular.

BACKGROUND OF THE INVENTION

Such cutting inserts have lateral faces which intersect at a radiused corner having a given radius and forming a corner angle therebetween. The larger the corner angle the smaller the radius may be without concern of the corner breaking. If the corner of such a cutting insert is truncated, the angle formed between each lateral face and a face of the truncated corner is enlarged and as a result a radius connecting each lateral face and the face of the truncated corner may be smaller. A cutting edge associated with each lateral face and ending at a small radius forms more uniform chips which reduces wear to the cutting insert.

In order to increase the degree of indexability of the cutting insert, each lateral face should preferably form an identical angle with the face of the truncated corner. However, when the cutting insert has a standard entering angle of 45° between its cutting edge and the direction of feed, the face of the truncated corner may undesirably engage a workpiece.

SUMMARY OF THE INVENTION

In accordance with the present invention there is provided a cutting insert comprising two opposing end surfaces having a first axis passing therethrough, a peripheral side surface extending between the end surfaces and a peripheral edge formed at an intersection of each end surface with the peripheral side surface, at least one peripheral edge comprises two minor edges and a cutting edge extending therebetween, the peripheral side surface comprises two minor faces, each minor face forming an internal obtuse angle with a major face extending therebetween, the cutting edge being associated with the major face and a first section of each minor edge being associated with a respective minor face and extending from the cutting edge generally towards the opposing end surface.

Typically, the cutting insert has 180° rotational symmetry about the first axis.

Preferably, a second axis perpendicular to the first axis passes through the major face and the cutting insert has symmetry of 180° around the second axis together with 90° around the first axis.

Typically, each end surface comprises a support surface and each cutting edge has in the direction of the first axis an opposing portion of the support surface.

Preferably, an identical internal obtuse angle is formed between each minor face and adjacent major face.

Typically, each minor edge has a second section extending from the first section generally away from the opposing end surface, the second section not being associated with the minor face.

BRIEF DESCRIPTION OF THE DRAWINGS

For a better understanding of the present invention and to show how the same may be carried out in practice, reference will now be made to the accompanying drawings, in which.

DETAILED DESCRIPTION

Figure 1:
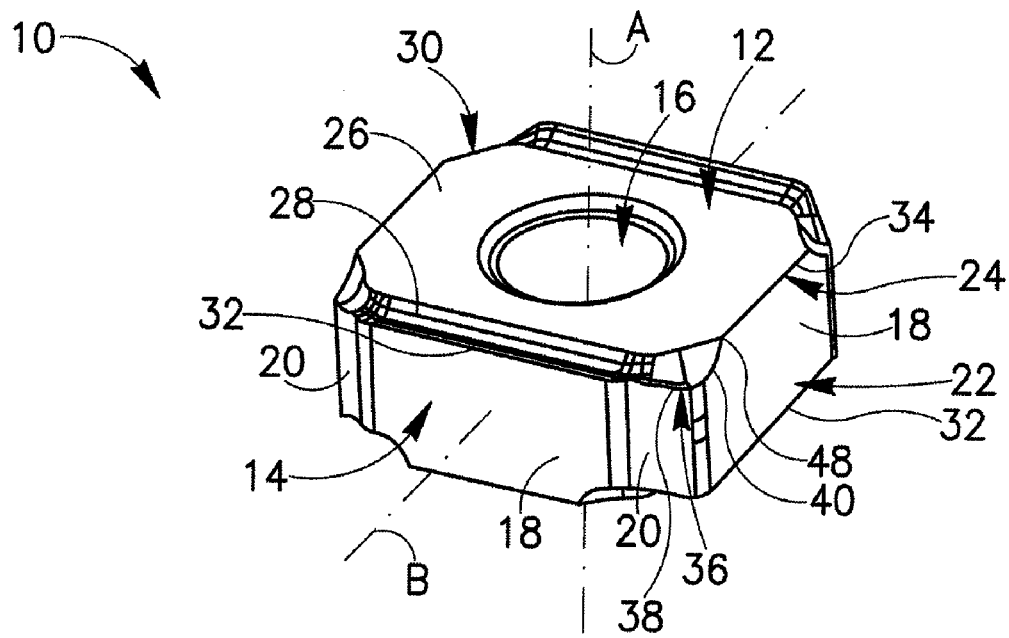
FIG. 1 is a perspective top view of a cutting insert in accordance with the present invention.
Figure 2:
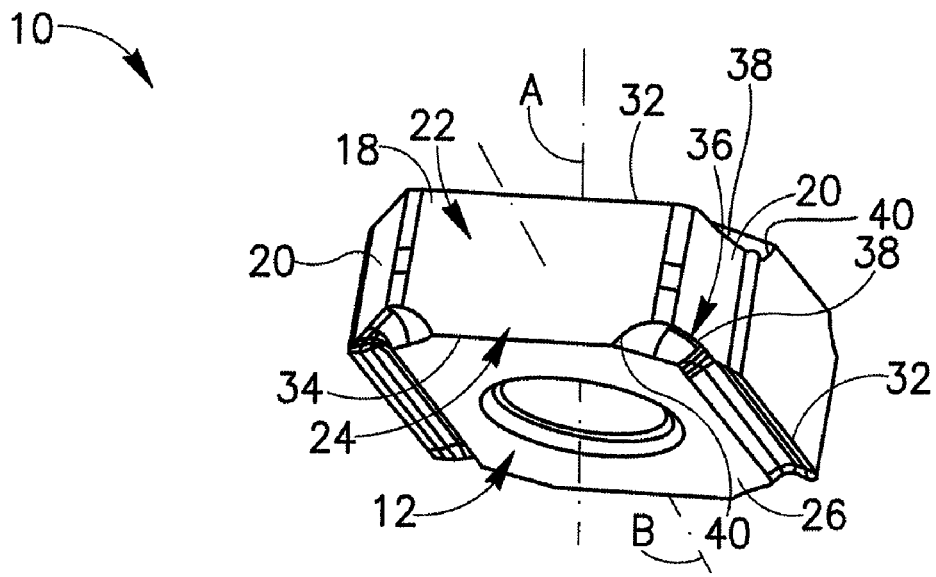
FIG. 2 is a perspective bottom view of the cutting insert.
Figure 3:
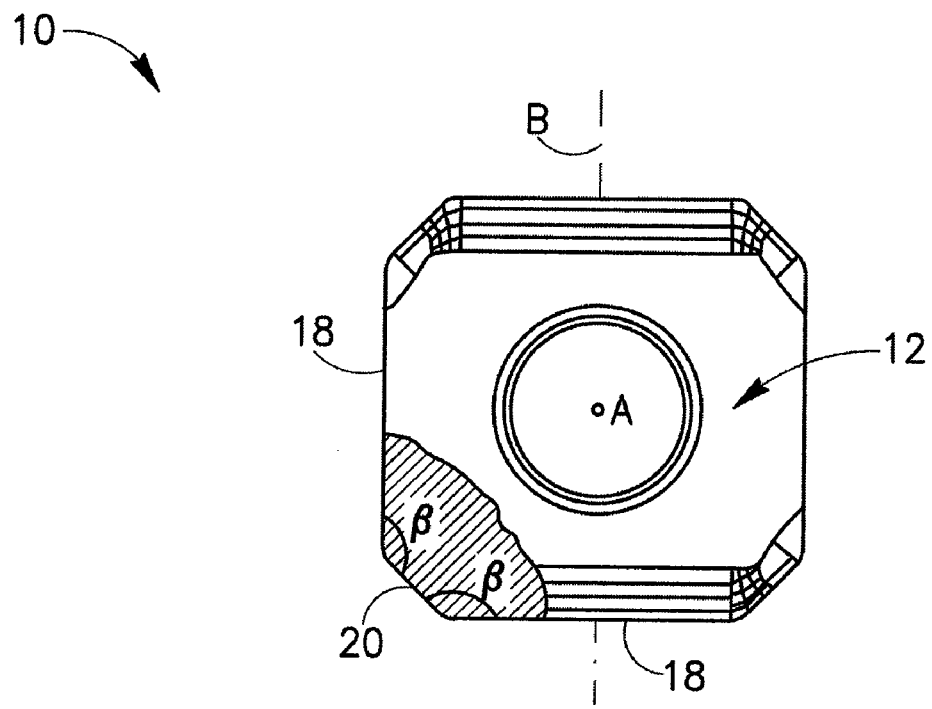
FIG. 3 is a partial cross sectional top view of the cutting insert.

Attention is first drawn to FIGS. 1 to 3 showing an indexable cutting insert 10 which is typically manufactured by form pressing and sintering carbide powders. It should be noted that directional terms appearing throughout the specification and claims, e.g. "forward", "rear", etc., (and derivatives thereof) are for illustrative purposes only, and are not intended to limit the scope of the appended claims.

The cutting insert 10 has two identical opposing end surfaces 12 and a peripheral side surface 14 extending therebetween. The cutting insert 10 is of a negative type and therefore the peripheral side surface 14 is generally perpendicular to both end surfaces 12. A first axis A of the cutting insert 10 passes through the end surfaces 12 and a through bore 16 having a bore axis that coincides with the first axis A extends between the end surfaces 12.

The peripheral side surface 14 of the cutting insert 10 comprises four identical major faces 18 and four identical minor faces 20. Each major face 18 is parallel to an opposing major face 18 and perpendicular to an adjacent major face 18. Each minor face 20 extends between a pair of adjacent major faces 18 and forms an identical internal obtuse angle β (see FIG. 3) with each one of the adjacent major faces 18. In such an embodiment wherein adjacent major faces 18 are perpendicular to each other, the value of the angle β is 135°. Furthermore, as seen in the top view of FIG. 3, in this embodiment, the cutting insert 10 has eight sides formed by the four major faces 18 separated by the four minor faces 20.

Each major face 18 has a first end 22 adjacent one end surface 12 and a second end 24 adjacent the opposing end surface 12. Each end surface 12 comprises a support surface 26, on which the cutting insert 10 is supported in an insert pocket, and two rake surfaces 28. A peripheral edge 30 is formed at an intersection of each end surface 12 with the peripheral side surface 14. The peripheral edge 30 has two identical opposing cutting edges 32, two identical opposing support edges 34 and four identical minor edges 36 located each between an adjacent cutting edge 32 and support edge 34. The support edges 34 do not form edges which can cut and therefore are not considered as cutting edges. Hereinafter, they are sometimes referred to as "non-cutting edges". Each cutting edge 32 is associated with a given rake surface 28 of a respective end surface 12 and with the first end 22 of a given major face 18. Each support edge 34 is associated with the support surface 26 of a respective end surface 12 and with the second end 24 of a given major face 18.

Each minor edge 36 has a first minor edge section 38 associated with a given minor face 20 and a second minor edge section 40 associated with a portion of the second end 24 of an adjacent major face 18 and not with the given minor face 20. The first minor edge section 38 extends away from an adjacent cutting edge 32 in a direction transverse to the first axis A and towards the opposing end surface 12. The second minor edge section 40 extends away from the first minor edge section 38 to an adjacent support edge 34 in a direction transverse to the first axis A and away from the opposing end surface 12. A second axis B of the cutting insert 10 is perpendicular to the first axis A and passes through a pair of opposing major faces 18.

The cutting insert 10 has a first symmetry of 180° around the first axis A. The cutting insert also has a second symmetry defined by a rotation of 180° around the second axis B plus a 90° rotation around the first axis A. It is noted that the second symmetry of the cutting insert 10 can exist, inter alia, due the fact that each minor face 20 forms an identical internal obtuse angle β with each one of the adjacent major faces 18.

Figure 4:
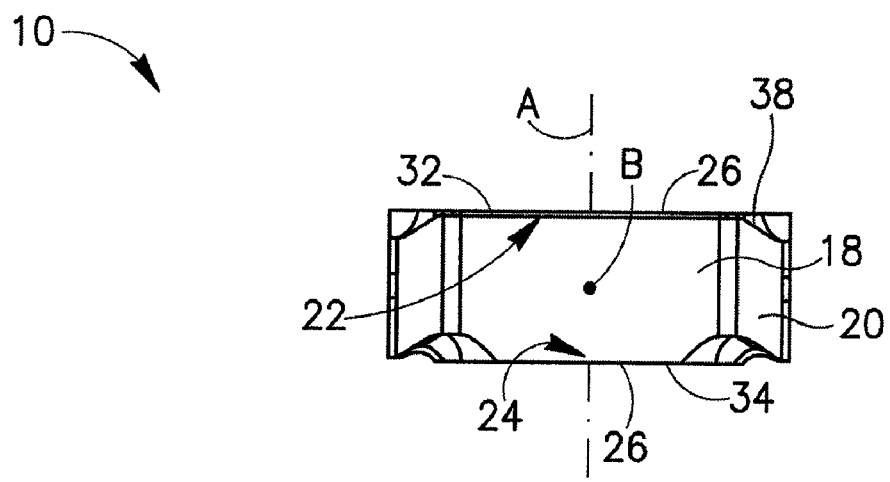
FIG. 4 is a side view of the cutting insert.

Attention is now additionally drawn to FIG. 4 in which it can be seen that, in a direction of the first axis A, the cutting insert's support surfaces 26 protrude outwardly in relation to the cutting edges 32. Thus, the support surfaces 26 are raised relative to the adjacent cutting edges 32 or, cast in other words, the cutting edges 32 are recessed relative to the adjacent support surfaces 26, in a thickness direction of the cutting insert along the first axis A. As a result, the support surfaces 26 may be ground without damaging the cutting edges 32 and the cutting edges 32 will not damage the insert pocket when the cutting insert 10 is supported therein. It will be appreciated that due to the cutting insert's second symmetry, the indexability of the cutting insert is such that each cutting edge 32 has in the direction of the first axis A an opposing support surface 26 which extends to a support edge 34. This provides the cutting insert 10 with support against cutting forces acting on the cutting edges 32 in the direction of the first axis A during a cutting process.

Figure 5:
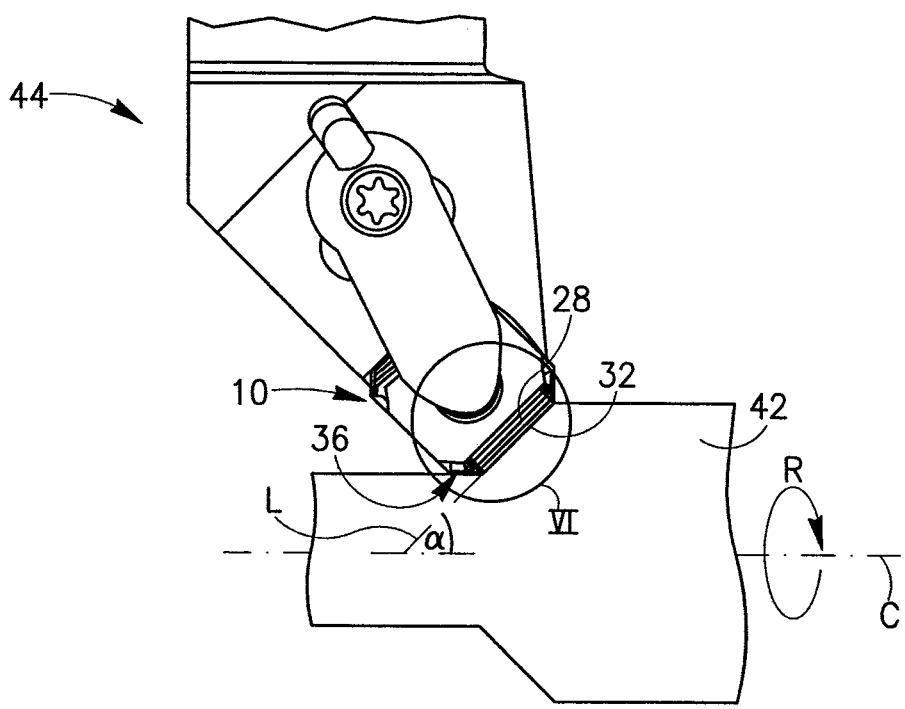
FIG. 5 is a top view of a cutting tool with the cutting insert according to the present invention mounted therein.
Figure 6:
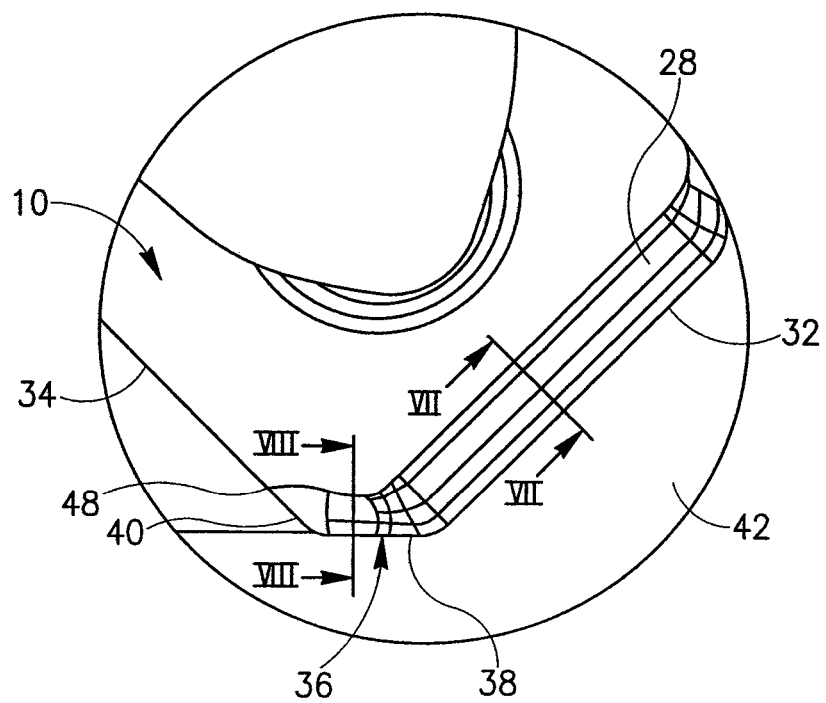
FIG. 6 is a detail of FIG. 5.
Figure 7:
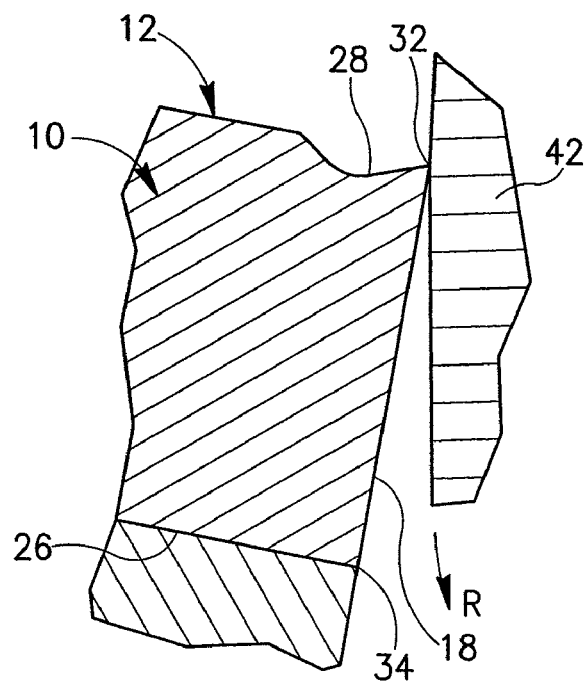
FIG. 7 is a partial cross sectional view taken along the line VII-VII in FIG. 6.

Attention is now drawn to FIGS. 5 to 7. A workpiece 42 has an axis of rotation C defining a direction of rotation R and a standard cutting tool for turning 44 has a longitudinal feed direction and a radial feed direction. The cutting insert 10 is supported in the cutting tool 44 and has an operative cutting edge 32 which engages the workpiece 42. The rake surface 28 associated with the operative cutting edge 32 generally faces an opposing direction to the direction of rotation R. The operative cutting edge 32 and the axis of rotation C lie in a plane and an imaginary line L passing through the operative cutting edge forms an angle α of about 45° with the axis of rotation C. The orientation of the cutting insert 10 in the cutting tool 44 is such that it is rotated (i.e., tilted) about the operative cutting edge 32 in such a manner that the major face 18 associated with the operative cutting edge 32 (the associated major face 18 being hidden from view in FIGS. 5 and 6) extends away from the workpiece 42 with the spacing between the major face 18 and the workpiece 42 increasing in the direction of the opposing end surface. This orientation contributes to relief of the cutting insert 10 from the workpiece 42 along the major face 18.

Figure 8:
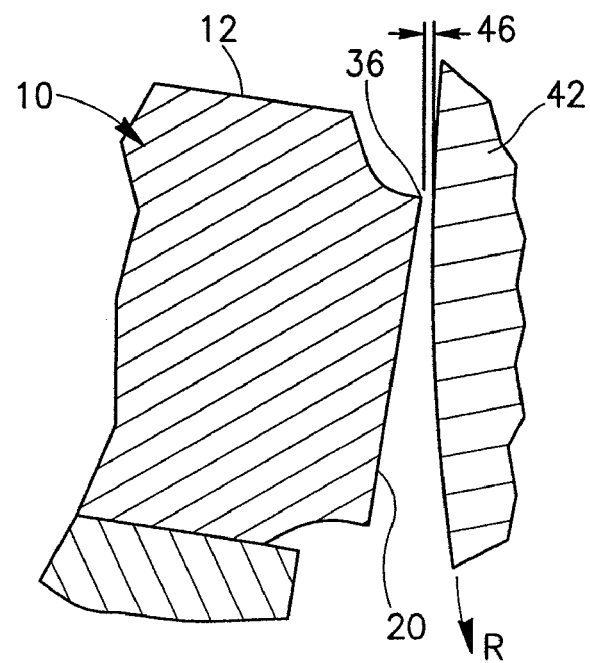
FIG. 8 is a partial cross sectional view taken along the line VIII-VIII in FIG. 6.

Attention is additionally drawn to FIG. 8 where it is seen that the cutting insert 10 is also relieved from the workpiece 42 along the minor face 20. This relief is also contributed to by the cutting insert's rotation (i.e., tilt) about the operative cutting edge 32 and is characterized by the minor face 20 extending away from the workpiece 42 with the spacing between the minor face 20 and the workpiece 42 increasing in the direction of the opposing end surface.

The cutting insert 10 has an operative minor edge 36 adjacent the operative cutting edge 32. The operative minor edge 36 is associated with the minor face 20, which faces a direction perpendicular to the longitudinal feed direction. A gap 46 is formed between the first minor edge section 38 of the operative minor edge 36 and the workpiece 42. The gap 46 decreases along the first minor edge section 38 towards the operative cutting edge 32 and may engage the workpiece 42 and function as a wiper adjacent the operative cutting edge 32. A meeting point 48 (best seen in FIGS. 1 and 6) between the second minor edge section 40 of each minor edge 36 and the support surface 26 of a respective end surface 12 is associated with the second end 24 of an adjacent major face 18. This ensures that the gap 46 is maintained between the minor face 20 associated with the operative minor edge 36 and the workpiece 42 throughout the cutting process, except right adjacent the operative cutting edge 32 where the operative minor edge 36 may engage the workpiece and function as a wiper, as discussed above.

It is noted that the cutting tool 44 may machine a face of the workpiece 42 in the radial feed direction. In this case the minor edge 36 adjacent the operative cutting edge 32 and associated with the minor face 20 facing a direction perpendicular to the radial feed direction will be the operative minor edge 36 and will provide the gap 46 between its minor face 20 and the workpiece 42.

It can be seen from the foregoing that the cutting insert has an operative cutting edge when seated in a turning tool configured to machine a face of a workpiece that is rotating along a longitudinal axis. A minor edge adjacent the operative cutting edge serves as an operative minor edge. The operative minor edge has an associated operative minor face, and a gap is present between the operative minor face and the workpiece. The operative minor face is the face that faces a direction perpendicular to the feed direction.

The present invention potentially provides a number of advantages. First, larger angles and therefore smaller radiuses, which contribute to the formation of more uniform chips, may be formed between each minor and major face. Second, each minor face is provided with a specially shaped minor edge which ensures that it does not engage the workpiece. Lastly, cutting edges located on opposing end surfaces of the cutting insert may be supported by the support surfaces against forces acting thereon during a cutting process.

Although the present invention has been described to a certain degree of particularity, it should be understood that various alterations and modifications could be made without departing from the scope of the invention as hereinafter claimed.

What is claimed is:

1. A cutting insert comprising:
   two opposing end surfaces having a first axis passing therethrough;
   a peripheral side surface extending between the end surfaces and a peripheral edge formed at an intersection of each end surface with the peripheral side surface; wherein:
   at least one peripheral edge comprises two minor edges and a cutting edge extending therebetween;
   the peripheral side surface comprises two minor faces, each minor face forming an internal obtuse angle with a major face extending therebetween, with the cutting edge being associated with the major face; and
   each minor edge has a first minor edge section associated with a respective minor face, the first minor edge section extending from the cutting edge generally towards the opposing end surface, in a side view of the cutting insert.

2. The cutting insert according to claim 1, wherein the cutting insert has 180° rotational symmetry about the first axis.

3. The cutting insert according to claim 2, wherein:
   a second axis perpendicular to the first axis passes through the major face; and the cutting insert has a symmetry defined by a rotation of 180° around the second axis plus a 90° rotation around the first axis.

4. The cutting insert according to claim 1, wherein:
a second axis perpendicular to the first axis passes through the major face; and
the cutting insert has a symmetry defined by a rotation of 180° around the second axis plus a 90° rotation around the first axis.

5. The cutting insert according to claim 4, wherein each peripheral edge comprises at least one support edge located opposite a given cutting edge in the direction of the first axis.

6. The cutting insert according to claim 1, wherein an identical internal obtuse angle is formed between each minor face and adjacent major face.

7. The cutting insert according to claim 1, wherein each minor edge has a second minor edge section extending from the first minor edge section generally away from the opposing end surface, the second minor edge section not being associated with the minor face.

8. A cutting insert comprising:
two opposing end surfaces having a first axis passing therethrough;
a through bore extending between the two opposing end surfaces and having a bore axis that coincides with the first axis;
a peripheral side surface extending between the end surfaces; and
a peripheral edge formed at an intersection of each end surface with the peripheral side surface; wherein:
the peripheral side surface comprises four identical major faces and four identical minor faces, each major face having a first end adjacent one end surface and a second end adjacent the opposing end surface;
each major face extends between two minor faces, each of the two minor faces forming an internal obtuse angle with the major face that extends therebetween;
each peripheral edge comprises two identical opposing cutting edges, two identical opposing non-cutting support edges and four identical minor edges, each minor edge located between an adjacent cutting edge and a non-cutting support edge;
each cutting edge is associated with a major face; and
each minor edge has a first minor edge section associated with a respective minor face, the first minor edge section extending from the cutting edge generally towards the opposing end surface, in a side view of the cutting insert.

9. The cutting insert according to claim 8, wherein the cutting insert has 180° rotational symmetry about the first axis.

10. The cutting insert according to claim 9, wherein:
a second axis perpendicular to the first axis passes through the major face; and
the cutting insert has a symmetry defined by a rotation of 180° around the second axis plus a 90° rotation around the first axis.

11. The cutting in according to claim 8, wherein:
a second axis perpendicular to the first axis passes through the major face; and
the cutting insert has a symmetry defined by a rotation of 180° around the second axis plus a 90° rotation around the first axis.

12. The cutting insert according to claim 11, wherein each peripheral edge comprises at least one support edge located opposite a given cutting edge in the direction of the first axis.

13. The cutting insert according to claim 8, wherein an identical internal obtuse angle is formed between each minor face and adjacent major face.

14. The cutting insert according to claim 8, wherein each minor edge has a second minor edge section extending from the first minor edge section generally away from the opposing end surface, the second minor edge section not being associated with the minor face.

15. A turning tool comprising a cutting insert seated therein and having an operative cutting edge, the cutting insert comprising:
two opposing end surfaces having a first axis passing therethrough;
a through bore extending between the two opposing end surfaces and having a bore axis that coincides with the first axis;
a peripheral side surface extending between the end surfaces; and
a peripheral edge formed at an intersection of each end surface with the peripheral side surface; wherein:
the peripheral side surface comprises four identical major faces and four identical minor faces, each major face having a first end adjacent one end surface and a second end adjacent the opposing end surface;
each major face extends between two minor faces, each of the two minor faces forming an internal obtuse angle with the major face that extends therebetween;
each peripheral edge comprises two identical opposing cutting edges, two identical opposing non-cutting support edges and four identical minor edges, each minor edge located between an adjacent cutting edge and a non-cutting support edge;
each cutting edge is associated with a major face; and
each minor edge has a first minor edge section associated with a respective minor face, the first minor edge section extending from the cutting edge generally towards the opposing end surface, in a side view of the cutting insert.

16. The turning tool according to claim 15 in combination with a workpiece that is rotating along a longitudinal axis, the turning tool being configured to machine the workpiece, wherein:
a minor edge adjacent the operative cutting edge serves as an operative minor edge;
the operative minor edge has an associated operative minor face; and
a gap is present between the operative minor face and the workpiece.

17. The turning tool according to claim 16, configured to machine a face of a rotating workpiece along a longitudinal feed direction, wherein:
the operative minor face faces a direction perpendicular to the longitudinal feed direction.

18. The turning tool according to claim 16, configured to machine a face of a rotating workpiece along a radial feed direction, wherein:
the operative minor face faces a direction perpendicular to the radial feed direction.

19. The turning tool according to claim 16, wherein the gap between the operative minor face and the workpiece increases in the direction of the opposing end surface.

20. A cutting insert comprising:
two opposing end surfaces having a first axis passing therethrough;
a peripheral side surface extending between the end surfaces and a peripheral edge formed at an intersection of each end surface with the peripheral side surface; wherein:

at least one peripheral edge comprises:
  a first cutting edge extending between a first pair of minor edges and a second cutting edge extending between a second pair of minor edges, the first and second pairs of minor edges being distinct from one another, each minor edge having a first minor edge section associated with a respective minor face, the first minor edge section extending from the cutting edge generally towards the opposing end surface, in a side view of the cutting insert; and
the peripheral side surface comprises:
  a first pair of minor faces associated with the first pair of minor edges and a second pair of minor faces associated with the second pair of minor edges; and
  a first major face extending between the first pair of minor faces and a second major face extending between the second pair of minor faces, each minor face forming an internal obtuse angle with an adjacent major face, with the first and second cutting edges being associated with respective first and second major faces.

21. The cutting insert according to claim 20, wherein each minor edge has a second minor edge section extending from the first minor edge section generally away from the opposing end surface, the second minor edge section not being associated with the minor face.

* * * * *